United States Patent
Koff et al.

(10) Patent No.: US 7,024,365 B1
(45) Date of Patent: Apr. 4, 2006

(54) METHOD FOR GENERATING LOCALIZABLE MESSAGE CATALOGS FOR JAVA-BASED APPLICATIONS

(75) Inventors: Caroline Nan Koff, Ft Collins, CO (US); William Girard McCollom, Ft Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/412,106

(22) Filed: Oct. 4, 1999

(51) Int. Cl.
*G10L 11/00* (2006.01)
*G06F 9/44* (2006.01)

(52) U.S. Cl. .................... 704/270.1; 704/8
(58) Field of Classification Search ............ 704/8, 704/9, 10, 2, 3
See application file for complete search history.

(56) References Cited

U.S. PATENT DOCUMENTS

| | | | | |
|---|---|---|---|---|
| 6,425,123 | B1* | 7/2002 | Rojas et al. ............... | 704/8 |
| 6,453,462 | B1* | 9/2002 | Meade et al. .............. | 704/8 |
| 6,507,812 | B1* | 1/2003 | Meade et al. .............. | 704/8 |
| 6,591,272 | B1* | 7/2003 | Williams ................. | 707/102 |
| 2003/0212982 | A1* | 11/2003 | Brooks et al. ............ | 717/100 |

OTHER PUBLICATIONS

Akerley, John et al. "Programming with VisualAge for Java Version 2", IBM Redbooks, Nov. 1998, pp. 53-57, 112-122, 295-326. IBMCORP. Accessible online at: <http://www7.software.ibm.com/vadd-bin/ftpdl?1/vadc/redbooks/sg245264.pdf>.

Anonymous, "Writing Software for the International Market". Digital Unix Version 4.0 or Higher, Mar. 1996, 64 pages. Digital Equipment Corporation. Accessible online at: <http://h30097.www3.hp.com/docs/base_doc/DOCUMENTATION/HTML/AA-QOR4C-TE_html/TITLE.html>.

"Java Catalog File Process". IBM Technical Disclosure Bulletin, IBM CORP., New York, US, vol. 40, No. 6, Jun. 1, 1997, p. 115, ISSN: 0018-8689.

\* cited by examiner

*Primary Examiner*—David D. Knepper (57) ABSTRACT

A method for generating localizable message catalogs for Java-based applications is disclosed. Message catalogs that are automatically flagged for what needs to be manually translated are generated from a given Java source code file, which can then be used for translation. ListResourceBundle data structures that are compatible with Java's internationalization model are also generated from the message catalogs that were previously generated and manually translated into desired local language(s). This provides a more efficient means of maintaining a language-specific version of Java software after if has been released.

11 Claims, 6 Drawing Sheets

METHOD FOR GENERATING LOCALIZABLE MESSAGE CATALOGS FOR JAVA-BASED APPLICATIONS

FIELD OF THE INVENTION

The present invention relates generally to windows-based computer applications, and more particularly to localizable message catalogs for Java-based applications.

BACKGROUND OF THE INVENTION

The increasing use of the Internet and other distributed networks for a variety of purposes, including international commercial, scientific and cultural discourse, makes the ability to readily and reliably produce and support global software increasingly important. Global software, or applications, refers to software that is developed independently of specific languages or geographic regions and capable of being translated into any desired language or region of an end user at run-time.

The internationalization process implies that the software consists of a single set of binaries that operates under all languages, and that the language-sensitive areas in the source code, referred to as the "localizable areas", such as end-user visible strings, data and numeric formats, are stored in external files. The C/C++ programming language, for instance, uses this internationalization model by storing the language-sensitive areas in external files called "message catalogs". Message catalogs are based on the standard defined by the X/Open Portability Guide (XPG) and are thus very attractive for localization. These message catalogs are not source code but are text files, designed for localizability, that allow easy translation of texts into native languages, such as French, Italian, Russian, German or Japanese. The C/C++ programming language "loads" the appropriate language versions of these message catalogs based on the end-user's language at run-time. When a user starts up an internationalized application, the application first checks to see which locale is in use by the user. For instance, when a user runs an application on a German NT server, the user is using the German locale. The locale in use by the user, determined at run-time, will be used by the application for the display text and other user interface elements. If the user changes the locale in use, such as by restarting the desktop environment under another locale, the application will use that other locale to display the texts and other user interface elements.

This internationalization approach is not available for software written in the portable Java programming language by Sun Microsystems because the Java programming language does not store language-sensitive areas in the source code in message catalogs. The Java programming language provides a framework for developing global applications which allows for translation of end-user visible strings, referred to as "display strings" or "localizable strings," that may be shown to an intended user and therefore need to be translated for different countries. A Java global application is comprised of a collection of related Java source code files, hereafter referred to as a "package". Each of the Java source files contained in a package may contain display strings. To produce global software, these display strings need to be translated to different countries or languages of the intended users. This translation includes translation of messages, numbers, dates, and currency into a country's conventional formats. Non-display strings, such as comments and Universal Resource Locators (URLs), are used programmatically and are thus not translated.

As mentioned, the Java programming language does not store display strings in message catalogs but instead stores language-sensitive areas in a source code data structure referred to as a "ListResourceBundle". Basically, a ListResourceBundle data structure provides a way to access display strings according to locale conventions. The ListResourceBundle data structure has a unique identifier to a display string, referred to as a "display string key", that enables "display string value" mapping. A Java ListResourceBundle data structure can be stored in a separate external file and loaded at run-time.

Figure 1:
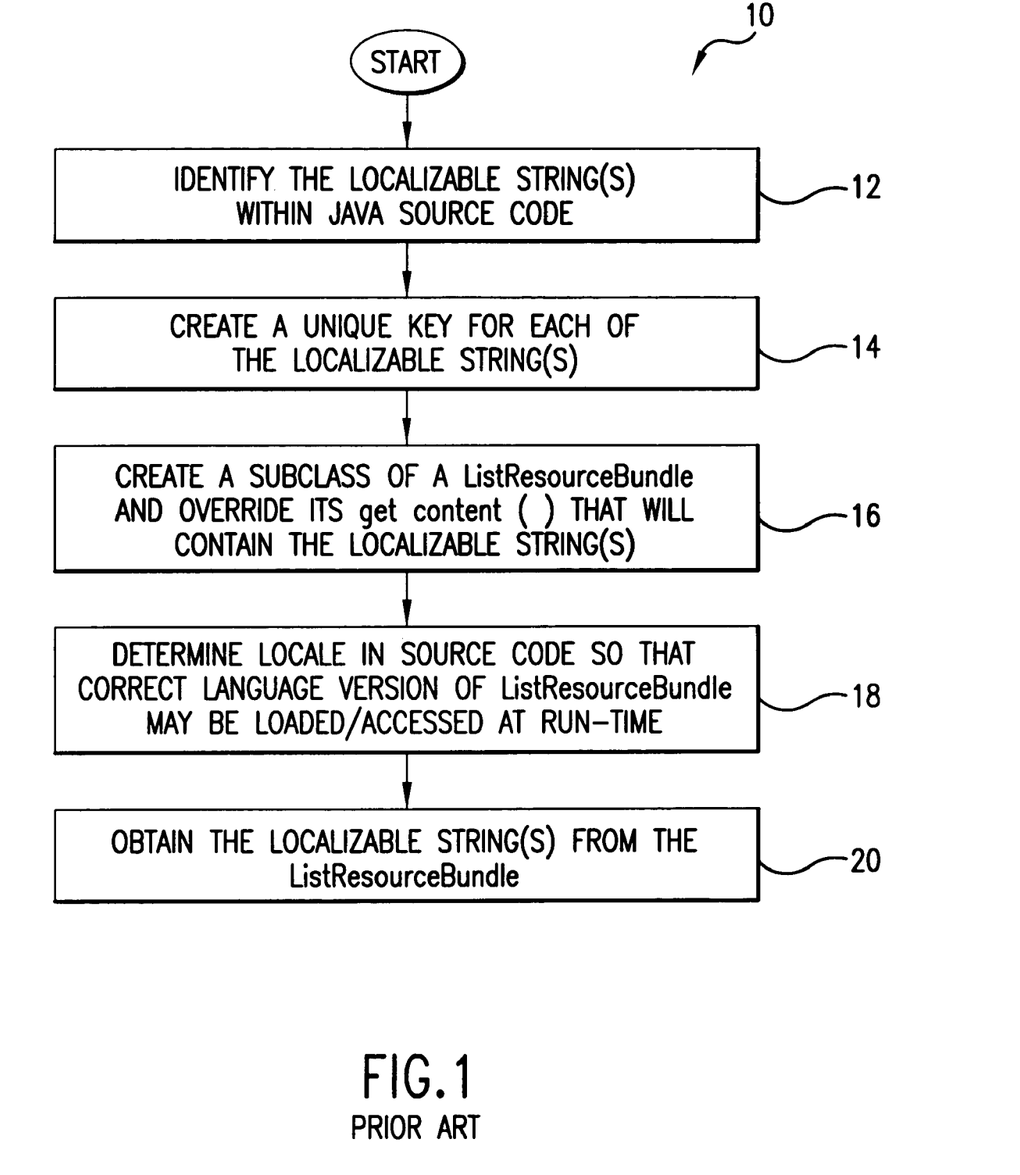
FIG. 1 is a flow chart for internationalizing a Java program, according to the prior art.
Figure 2:
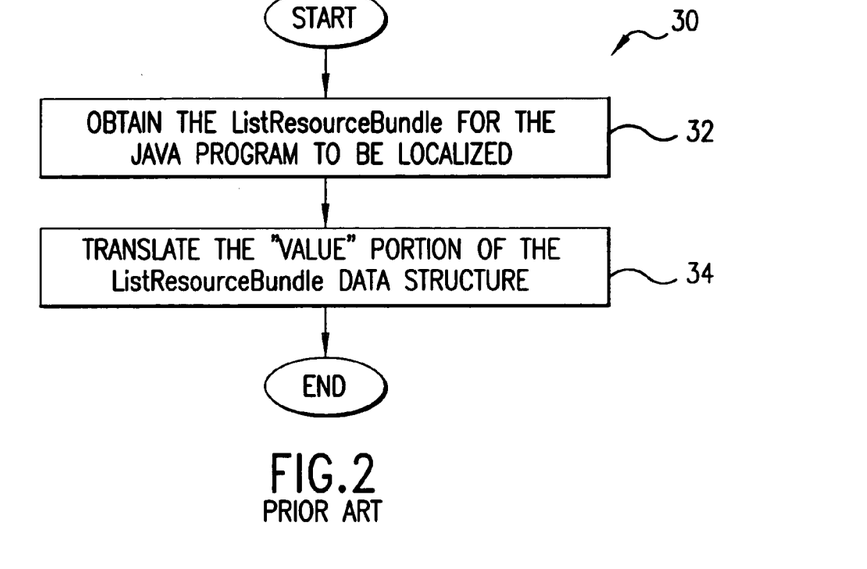
FIG. 2 is a flow chart for translating or localizing the Java program, according to the prior art.

FIGS. 1–2 provide an example of how Java programmers use existing Java methodology to internationalize a Java program and then how translators, also called localizers, subsequently localize the internationalized Java program. Referring to the flow chart 10 of FIG. 1, the first step, shown at Block 12, for internationalizing a Java program is to identify the localizable areas, such as localizable strings, within the Java source code. For purposes of this example only, assume that the Java code of interest is contained in a file named "myApplication.java":

```
/* "Display adjustment" and "Volume adjustment" are the
*/ /* strings that needs to be made localizable. As it
appears */ /* in this manner, they cannot be translated.
*/ myCheckbox1=new Checkbox("Display adjust-
ment");
myCheckbox2=new Checkbox("Volume adjustment");
```

It will be understood that only two strings have been shown in the example for ease of explanation and that one skilled in the art will recognize that Java source code will typically have dozens or even hundreds of strings. The next step, at Block 14, is to create a unique key for each of the identified localizable strings. Assume that the key for the localizable string "Display adjustment" will be "display_adj" and that the key for the localizable string "Volume adjustment" will be "volume_adj". At Block 16, the next step is create a subclass of a ListResourceBundle and override its getContents( ) method that will contain the localizable string(s). The following is some sample Java code in a file called "myResources.java":

```
import java.util.*;
public class myResources extends ListResourceBundle {
    public Object□□ getContents( ) { return contents };
    static final Object□□ contents = {
        {"display_adj", "Display adjustment"},
        {"volume_adj", "Volume adjustment"}
    };
};
```

Then, the locale in the source code must be determined so that the correct language version of ListResourceBundle can be loaded/accessed by the Java program at run-time, as shown in Block 18. Sample Java code that will accomplish this step is shown below and will be added prior to the Java code associated with Block 12 above:

```
/* Obtain the locale information for this application. */ /*
    If this Java program is running in French mode, */ /*
    "getDefault( )" will return French. */ Locale locale;
locale=Locale.getDefault( );
/* Use the locale information (from above) to obtain the
    */ /* locale-specific version of myResources. So, if the
    locale */ /* is set to French, the "getBundle( )" will
``` return a French */ /* language version of the ListResourceBundle. */ public static ResourceBundle rb;
rb=ResourceBundle.getBundle("myResources", locale);

Finally, at Block 20, the localizable string(s) are obtained from the ListResourceBundle. Sample Java code to accomplish this step in the "myApplication.java" file follows:

/* Obtain the locale information for this application. */ /* If this Java program is running in French mode, */ /* "getDefault( )" will return French. */ Locale locale; locale=Locale.getDefault( );
/* Use the locale information (from above) to obtain the */ /* locale-specific version of myResources. So, if the locale */ /* is set to French, the "getBundle( )" will return a French */ /* language version of the ListResourceBundle. */ public static ResourceBundle rb;
rb=ResourceBundle.getBundle("myResources", locale);
/* Obtain the localizable strings by calling "getString( )"*/ /* and by passing the key for each of the localizable strings. */ /* So, if the above calls fetched a French ListResourceBundle, */ /* myResources.rb.getString("display_adj")*/ /* will return the French translation of the string */ /* "Display Adjustment"*/ myCheckbox1=new Checkbox(myResources.rb.getString("display_adj"));
myCheckbox2=new Checkbox(myResources.rb.getString("volume_adj"));

The Java program has thus been internationalized according to the prior art method of FIG. 1. Now suppose that the internationalized Java program must be translated or localized to the desired locale. This methodology is illustrated by flow chart 30 of FIG. 2. The first step, at Block 32, is to obtain the ListResourceBundle for a given Java program that is to be localized. The ListResourceBundle will consist of Java code with "{key, value}" pairs. Sample Java code in the "myResources.java" file that will accomplish this step follows:

```
import java.util.*;
public class myResources extends ListResourceBundle {
    public Object□□ getContents( ) { return contents };
    static final Object□□ contents = {
        {"display_adj", "Display adjustment"},
        {"volume_adj", "Volume adjustment"}
    };
};
```

The next step, at Block 34, is to translate only the "value" portion and not the "key" portion of the ListResourceBundle source code data structure, being sure not to modify anything else within the source file. The file may be renamed to indicate the translation language. For instance, the French version of the "myResources.java" file may be titled the "myResources_fr.java" file. Sample Java code in the "myResources_fr.java" file may be as follows:

```
import java.util.*;
public class myResources extends ListResourceBundle {
    public Object□□ getContents( ) { return contents };
    static final Object□□ contents = {
        {"display_adj", "Re'glage d'affichage"},
        {"volume_adj", "Re'glage de volume"},
    };
};
```

Unfortunately, using a ListResourceBundle data structure presents several disadvantages, as can be seen from the above example. First, ListResourceBundle data structures are source code and are therefore not easily translatable. Translators cannot use any of the "localization tools" applicable for message catalogs and the difficulty becomes distinguishing display strings which need to be translated from non-display strings which do not require translation. The Java code thus has to be combed manually, i.e. line-by-line, to identify the display strings that need to be translated. The display strings must then be changed manually to make it translatable. Needless to say, this process is very time-consuming and inefficient. While mechanisms such as PERL script may be used to assist in this endeavor, the results must still be checked manually.

Second, writing Java source code that loads and accesses a ListResourceBundle data structure is cumbersome. Additionally, identifying obsolete or new or modified strings that require new translations is difficult using a ListResourceBundle data structure. Modifying the Java source code without translating the accompanying ListResourceBundle data structure will cause the Java program to throw an exception, sometimes referred to as "throwing an exception," similar to a core dump in a C program, for not being able to find a translated string. Finally, modifying an existing non-global application to use ListResourceBundle data structures is difficult because the process of separating the display strings from the Java source code generally cannot be done automatically. It is much easier to build a global program from the ground up rather than attempt to retrofit an existing non-global application because of this difficulty. It is therefore difficult to modify an existing Java-based non-global application to make it capable of using ListResourceBundle data structures.

SUMMARY OF THE INVENTION

It is therefore an object of the present invention to provide easily translatable display strings for the Java programming language. It is another object of the present invention to provide a less cumbersome means of loading and accessing a ListResourceBundle data structure. It is yet another object of the present invention to identify obsolete or new or modified display strings that require new translations. Finally, it is an object of the present invention to provide a means of converting an existing non-global application into a global application using ListResourceBundle data structures.

Therefore, according to the present invention, a methodology for generating localizable message catalogs for Java-based applications is disclosed. Message catalogs that are automatically flagged for what needs to be manually translated are generated from a given Java source code file, which can then be used for translation. ListResourceBundle data structures that are compatible with Java's internationalization model are also generated from the message catalogs that were previously generated and manually translated into desired local language(s). The methodology comprises: identifying one or more localizable strings of a Java source code; marking the one or more localizable strings to produce one or more marked localizable strings by inserting a marker into each localizable string of the one or more localizable strings that are function calls to an internationalization tool; extracting the one or more marked localizable strings; storing the one or more marked localizable strings into an external text file, such as a message catalog file; and generating one or more ListResourceBundle data structures from the one or more marked localizable strings stored in the external text file. Extracting and storing the one or more marked localizable strings into one or more text files and generating the one or more ListResourceBundle data structures occurs when the Java source code is compiled. The one or more ListResourceBundle data structures are generated by: determining a current locale language in which the Java source code is running; determining whether the current locale language is a default language; if the current locale language is the default language, returning a marked localizable string of the one or more marked localizable strings; if the current local language is not the default language, determining whether a language-specific version of the marked localizable string that corresponds to the current locale language exists in a ListResourceBundle data structure of the one or more ListResourceBundle data structures that corresponds to the marked localizable string; and if the language-specific version exists, opening the ListResourceBundle that corresponds to the marked localizable string and returning the language-specific version of the marked localizable string from the ListResourceBundle. The one or more marked localizable strings of the Java source code can be translated by: obtaining the external text file containing the one or more marked localizable strings; translating the one or more marked localizable strings stored in the external text file; and generating a ListResourceBundle data structure for the translated one or more marked localizable strings.

After storing the marked localizable strings into the external text file, the methodology further comprises: generating a new version of the Java source code in a second directory from which an internationalization tool is run; retrieving the marked localizable strings from a ListResourceBundle class; and generating a merged external text file containing the one or more marked localizable strings in the first directory and the second directory. ListResourceBundle files corresponding to the merged external text file with each ListResourceBundle file of the one or more ListResourceBundle files corresponding to a desired language are generated.

The above methodology is accomplished according to the following: opening an original Java source code file that is stored in a first directory; opening a first message catalog file; copying the first message catalog file to a second message catalog file; creating a modified Java source code file from the original Java source code file in a second directory; reading the contents of the original Java source code file into a buffer; if the buffer contains one or more marked localizable strings, for each marked localizable string of the one or more marked localizable strings comprising: obtaining a message number corresponding to the marked localizable string and replacing the marked localizable string in the buffer with a method call that can obtain the marked localizable string if the marked localizable string is stored in the first message catalog file, or appending the marked localizable string to the second message catalog file and removing a marker from the marked localizable string in the buffer to convert the marked localizable string to a default localized string if the marked localizable string is not stored in the first message catalog file; writing to the modified Java source code file from the buffer; and closing the original Java source code file, the first message catalog file, the second message catalog file, and the modified Java source code file.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The method for generating localizable message catalogs for Java-based applications of the present invention provides a mechanism whereby a ListResourceBundle data structure file is automatically generated from an existing Java source code file using an intermediate message catalog file that may be manually translated to a local native language to provide global software that can operate under various native language environments and thus is capable of being used world-wide. This mechanism of the present invention, referred to as the internationalization tool, generates Unix-style message catalogs as intermediate files and then generates ListResourceBundle data structures from those intermediate message catalogs. Without the internationalization tool, the programmer must manually create the ListResourceBundle data structures used by Java to create localizable strings. When a user starts up an internationalized Java-based application, the application determines the locale in use by the user and that locale will be used by the application for the display text and other user interface elements.

Therefore, according to the present invention, a method for generating localizable message catalogs, in which there is one message catalog file per Java package-and not per Java class-is disclosed. First, the present invention generates message catalogs automatically from a given Java source code, which can then be used for translation. Next, the present invention automatically generates the ListResourceBundle data structures from the message catalogs that were derived and translated so that the final result is compatible with Java's internationalization model. Finally, the present invention automatically flags what needs to be translated providing a more efficient means of maintaining a language-specific version of Java-based software after it has been released.

Figure 3:
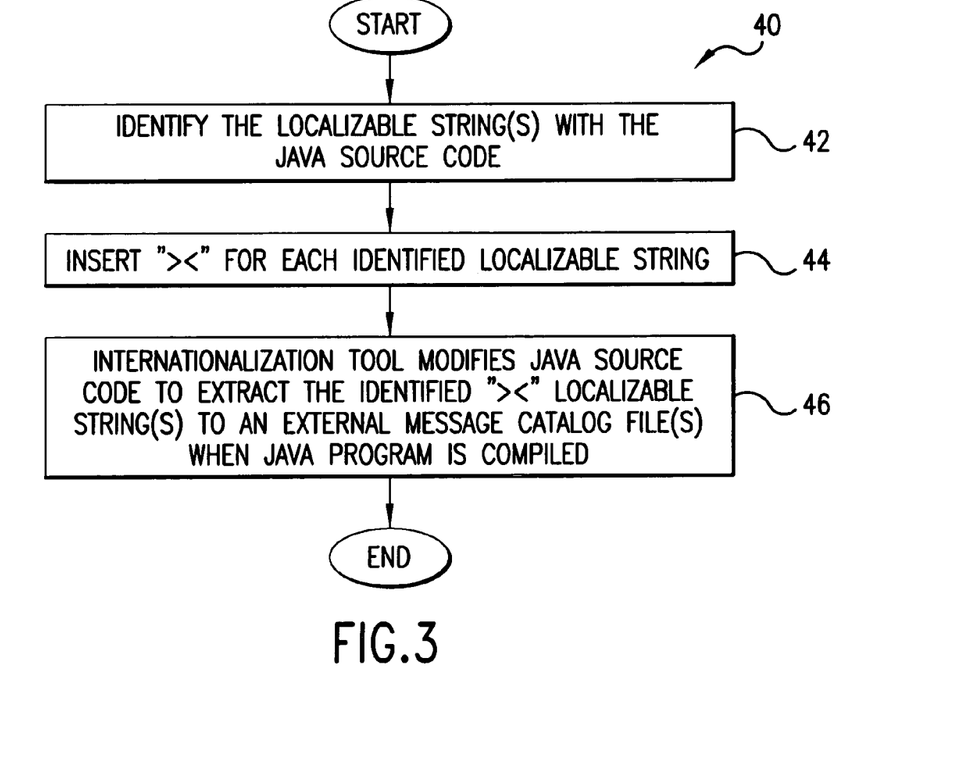
FIG. 3 is a flow chart that illustrates the methodology for internationalizing a Java program and then translating the internationalized Java program to a desired locale, according to the present invention.

Referring now to FIGS. 3–7, the methodology of the present invention for internationalizing a Java program and then translating the internationalized Java program to a desired locale is described. Referring first to the flow chart 40 of FIG. 3, the Java programmer identifies the localizable string(s) within the Java source code that make up a Java package at Block 42. These localizable string(s) include previously localized strings, modified strings, and new strings. There is one message catalog per Java package, not per Java class. This step is similar to Block 12 of FIG. 1 and sample Java code in file "myApplication.java" follows:

/* "Display adjustment" and "Volume adjustment" are the */ /* strings that needs to be made localizable. As it appears */ /* in this manner, they cannot be translated. */ myCheckbox1=new Checkbox("Display adjustment");

myCheckbox2=new Checkbox("Volume adjustment");

The next step, at Block 44, is for the programmer to insert a "><" marker for each of the localizable strings. The file "myApplication.java" is modified in this manner:

/* "Display adjustment" and "Volume adjustment" are the */ /* localizable strings. */ myCheckbox1=new Checkbox("><Display adjustment");

myCheckbox2=new Checkbox("><Volume adjustment");

The localizable display strings "Display adjustment" and "Volume adjustment" of the file "myApplication.java" are easily identified by the "><" inserted by the programmer and are taken out of the source code and stored in one or more external message catalog files for later translation. A representative source version of the message catalog file for the "myApplication.java" file is as follows:

$set 1

1 Display adjustment

2 Volume adjustment

It is noted that the message catalog file contains simply the localizable display string and does not contain Java source code, thereby making it easily translatable. This source version of the message catalog file contains messages and is not yet compiled.

Next, at Block 46, an internationalization tool of the present invention modifies the Java source code to extract the identified localizable string(s), marked with "><", to one or more external, intermediate message catalog files when the Java program is compiled. Strings marked with "><" in the source files are extracted and converted to localizable messages in output file(s), i.e. message catalog file(s). The localized messages in the message catalog file(s) are function calls to an internationalization tool-generated function that is used as an access to ListResourceBundle data structures for Java sources. For Java programs, the internationalization tool converts the message catalogs into ListResourceBundle data structures. This activity occurs automatically when the Java program is compiled. It is transparent to the user and requires no intervention by the Java programmer. As will be described, the internationalization tool also generates the getString function.

Figure 4:
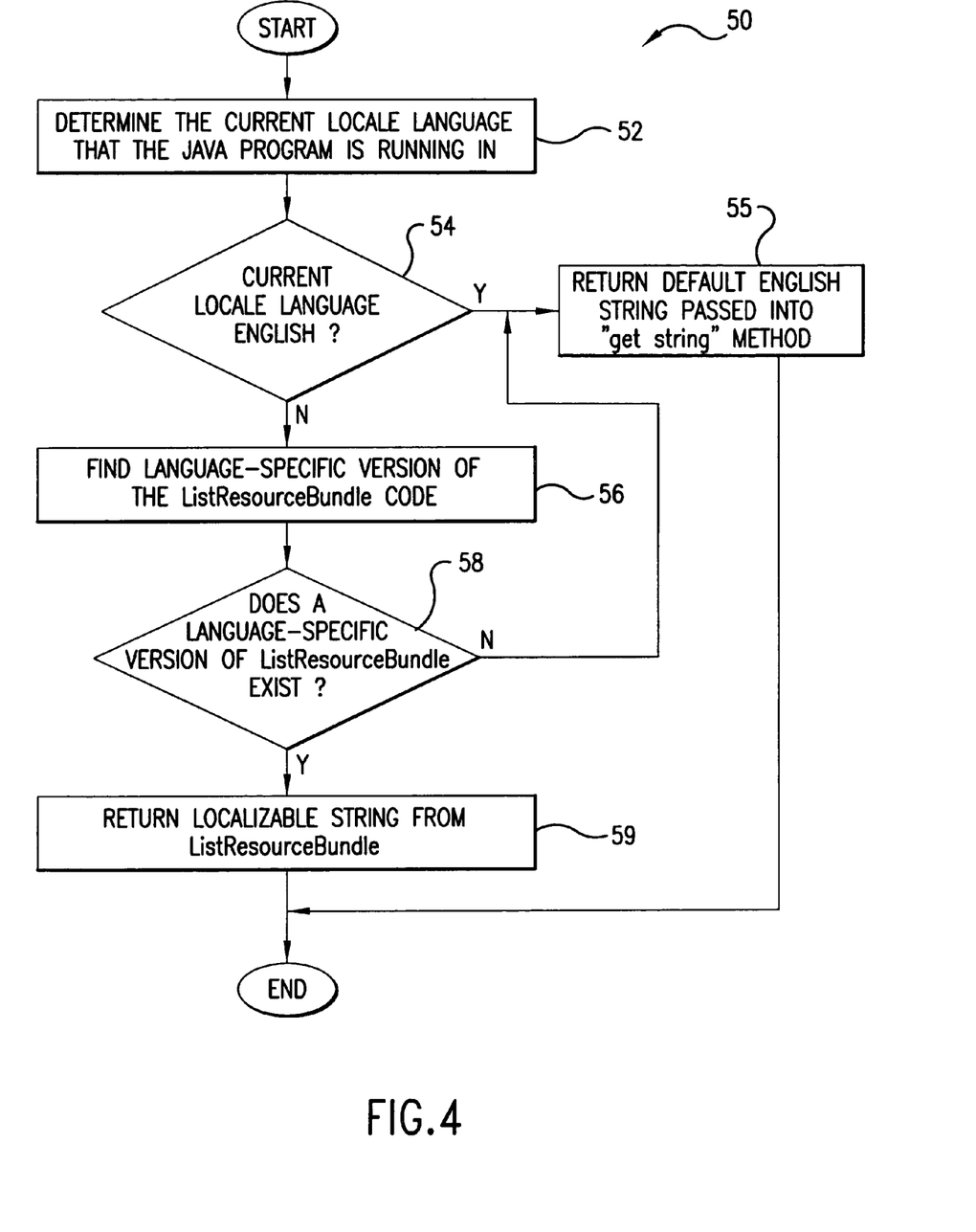
FIG. 4 is a flow chart that illustrates the MsgHandler.java class, including the "getString" method, according to the present invention.

Continuing with the given example, when the above Java program is compiled, the internationalization tool will intervene and modify the Java source code file "myApplication.java" so that it becomes the following:

Locale locale;

locale=Locale.getDefault( );

public static ResourceBundle rb;

rb=ResourceBundle.getBundle("myResources", locale);

myCheckbox1=new Checkbox(MsgHandler.getString ("1","Display Adjustment"));

myCheckbox2=new Checkbox(MsgHandler.getString ("2","Volume Adjustment"));

The internationalization tool automatically generates a new Java class, called "MsgHandler.java", having the definition of one method or function, called the "getString( )" method. A representative MsgHandler.java file that is automatically generated by internationalization tool follows:

```
import java.util.*;
public class MsgHandler {
    public static String getString(String key, String defaultMessage) {
//SECTION A of CODE
        if (!initialized) {
            Locale locale = null;
            //get the default locale
            locale = Locale.getDefault( );
//SECTION B of CODE
            String locale_language;
            locale_language = locale.getLanguage( );
            if (!(locale_language.equals("en"))) {
                try {
                    rb = ResourceBundle.getBundle("myResources", locale);
                }
                catch (Exception ex) {
                    rb = null;
                }
            } // if
            else rb = null;
            initialized = true;
        }
//SECTION C of CODE
        if (rb == null) return defaultMessage;
//SECTION D of CODE
        String str;
        try {
            str = rb.getString(key);
        } catch (Exception ex1) {
            str - defaultMessage;
        }
```

```
        return str;
    }
    private static ResourceBundle rb;
    private static boolean initialized = false;
}
```

This representative code of the internationalization tool automatically generates the MsgHandler.java class. The MsgHandler.java class consists of one method called "getString". The "getString" method performs various functional steps outlined in Sections A–D of the code and illustrated in the methodology of FIG. 4. It is recognized that the particular source code for the "MsgHandler.java" file may be different from that shown above without departing from the spirit and scope of the invention.

Referring now to FIG. 4, methodology 50 of the "MsgHandler.java" file is illustrated. At Block 52, the current locale language being used by the Java program must be determined. Is the program currently running in the English, French, or Japanese languages, for instance? Section A of the MsgHandler.java file above accomplishes this step. Next, at Decision Block 54, the inquiry is whether this current language is English, the default language. If it is, then the default English string that was passed into the "getString" method is returned at Block 55; this is accomplished by Section C of the MsgHandler.java file. If the current language is not English, then the flow continues to Block 56. At Block 56, the language-specific version of the ListResourceBundle code is located, as illustrated by Section B of the MsgHandler.java file. Next, the inquiry at Decision Block 58 is whether the language-specific version of the ListResourceBundle code exists. If it does not exist, the flow goes to Block 55 to return the default English string that was passed into the "getString" method; this is demonstrated by Section C of the MsgHandler.java file code. If the language-specific version does exist, then the language-specific localized string from the ListResourceBundle is returned at Block 59, such as demonstrated by Section D of the above code.

The automatic call performed by the "getString" method has a key benefit for performance. A call to open a ListResourceBundle is relatively expensive in terms of the time required to make a call over a network and the "getString" method provides the advantage of minimizes such calls. Also, from Block 106 of FIG. 6, one can see that the internationalization tool will not even call the wrapper function of "getString" if the ><string has not been localized. This too represents a performance improvement because in this case there is no need to check for the locale information and the "getString" method is bypassed.

In addition to this performance advantage, another advantage that is realized with the "getString" method is the ease with which Java software may be upgraded. This is best explained with an example. Suppose that the internationalized Java program originally contained two localization strings, as in the above example. Those two strings were translated in the French language. When the Java program is executed, the getString method will attempt to retrieve the localized/translated French strings. Now, suppose that the Java programmer adds another "><" string to this program or even modifies an existing "><" string, such as:

MyCheckbox1=new Checkbox ("><Display adjustment");
MyCheckbox2=new Checkbox ("><Volume adjustment");
MyCheckbox3=new Checkbox ("><Color adjustment");

It can be seen that a new string for color adjustment as been added.

Figure 7:
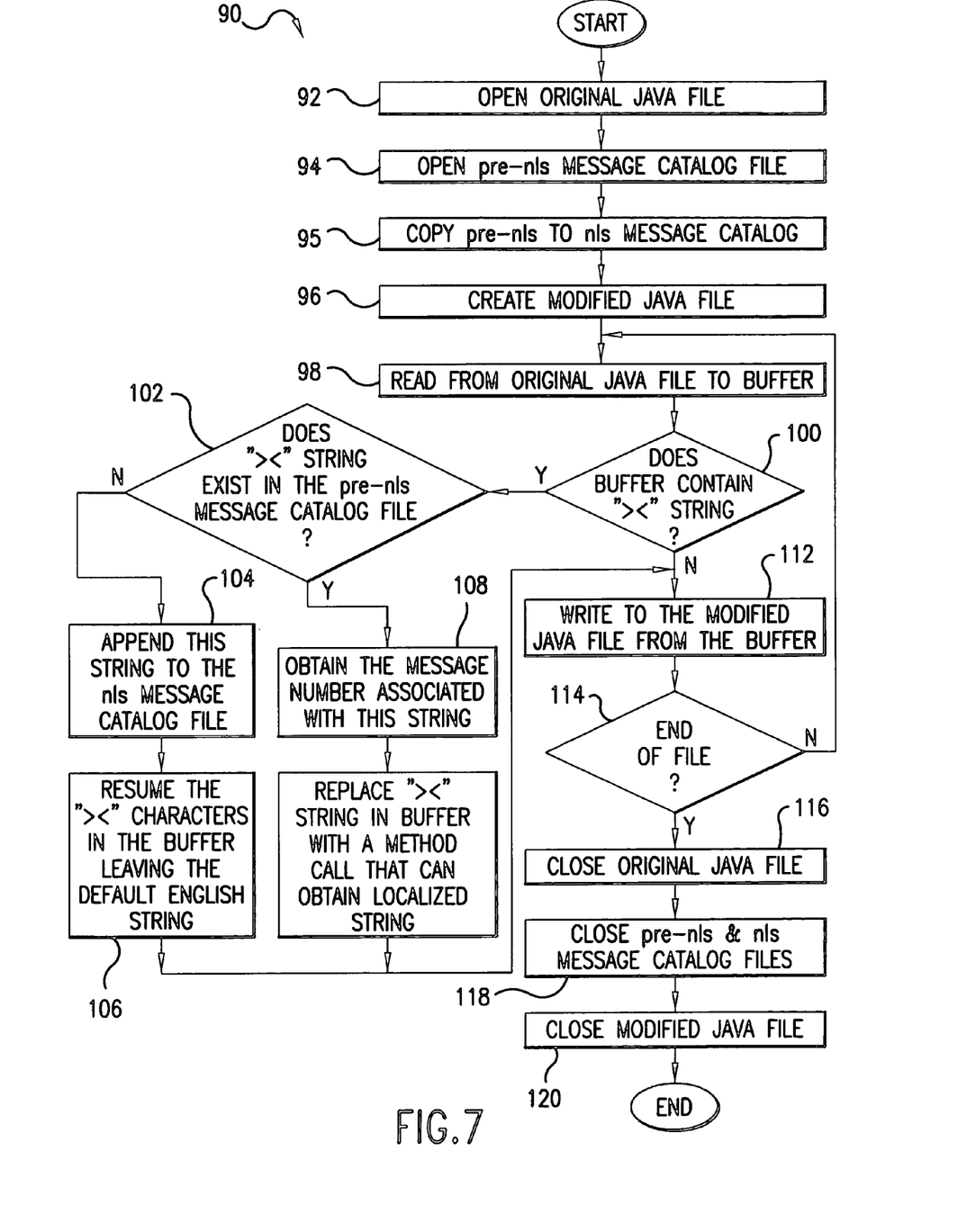
FIG. 7 is a flow chart that illustrates the methodology of the present invention, with emphasis on identifying modified strings that require new translations.

When this modified Java program is processed by the internationalization tool, the new "><" string will not be replaced with the getString method call because the internationalization tool knows that this string has not yet been localized as stated in Block 102 of FIG. 7. As a result, this modified Java program can execute under the French language even though this new string does not even appear in the ListResourceBundle associated with this French Java program, without throwing an exception. This allows the modified Java source code and ListResourceBundle to be decoupled, a condition that occurs when the ListResourceBundle data structure is not translated at the same time that the Java source code is modified without throwing an exception.

The above model allows easier upgrade of the Java software. The process has effectively "de-coupled," or separated, two processes: the process of internationalizing the Java program via the "><" indicator, accomplished by Java programmers, and the process of translating the message catalogs, accomplished by the translators. Since these separate processes are de-coupled, they can occur independently. This is an important characteristic when localizing software to any number of different languages for release at the same time-rather than releasing the English version first, followed by other language versions of the code. If these processes were not de-coupled in this manner, the Java program would always have to be in sync with the localized version of the ListResourceBundle data structure. This requirement is particularly onerous in the typical situation in which there is a team of programmers in one country and another team of translators in a different country. It is quite common that the team of translators are almost never on-site with the programmers. Moreover, the costs associated with translation may be prohibitive but, with the present invention, it is no longer necessary to always perform translation of modified or added strings at the time that the Java source code is modified.

Figure 5:
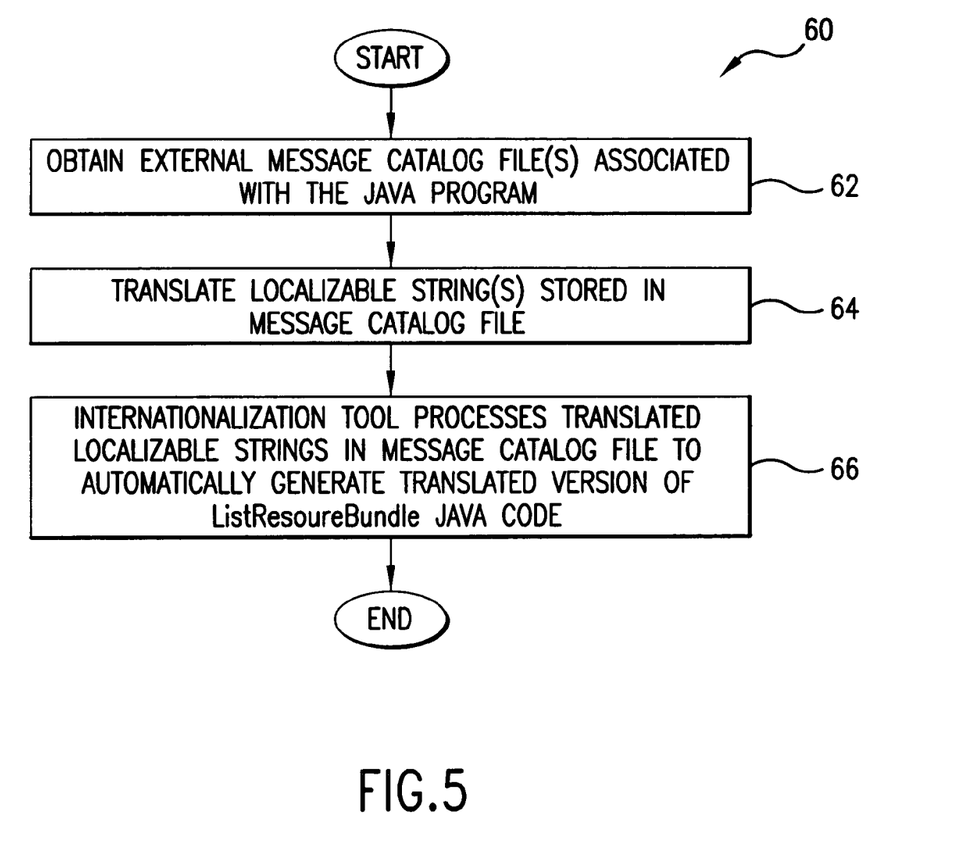
FIG. 5 is a flow chart that illustrates the methodology for translating or localizing a Java program, according to the present invention.

Now that internationalization of the Java program has been performed, the next step is translation of the localizable strings stored in the message catalog file. Referring now to FIG. 5, flow chart 60 illustrates the methodology of the present invention for translating the localizable string(s) and how the localized ListResourceBundle is generated. At Block 62, the message catalog file associated with the Java package of related Java source code files is obtained. As previously mentioned, it does not contain source code, containing only the display strings, and is therefore readily translatable. Next, at Block 64, the localizable display strings in the message catalog file are translated. Continuing with the above-described message catalog for the "myApplication.java" file, the French translated version of the message catalog is:

$set 1
1 Re'glage d'affichage
2 Re'glage de volume

Following the translation, the internationalization tool will again intervene and process the translated message catalog to automatically generate the translated version of the ListResourceBundle Java code, at Block 66. Sample Java code in file "myResources_fr.java" automatically generated by the internationalization tool would be:

```
import java.util.*;
public class myResources_fr extends ListResourceBundle {
    public Object☐☐ getContents( ) { return contents };
    static final Object☐☐ contents = {
        {"1", "Re'glage d'affichage"},
        {"2", "Re'glage de volume"},
    };
};
```

As previously discussed, the Java programming language uses ListResourceBundle to create localizable strings. The internationalization tool generates X/Open Portability Guide style message catalogs as intermediate files from which ListResourceBundle may be generated.

Figure 6:
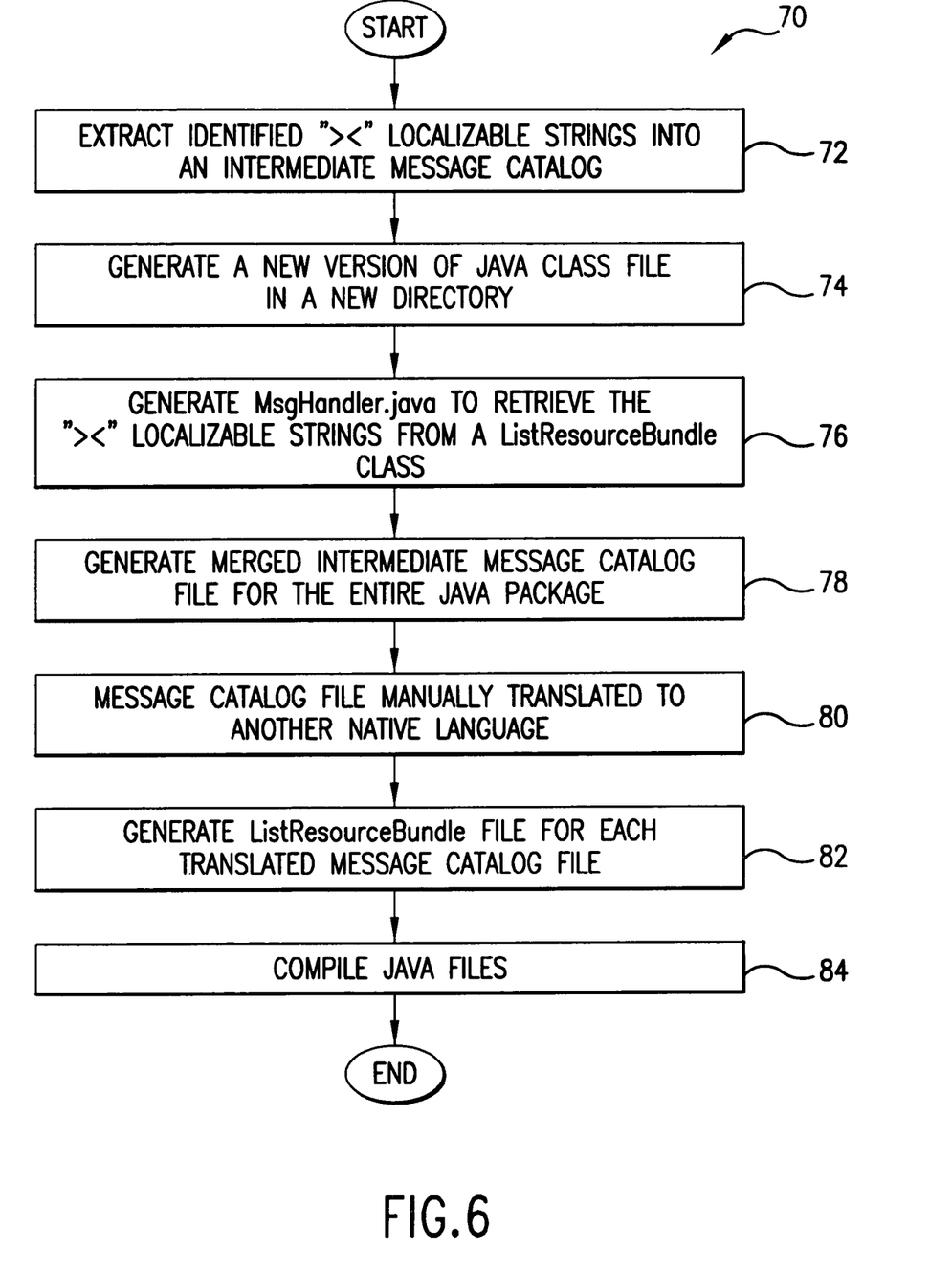
FIG. 6 is a flow chart that illustrates the methodology of the present invention.

A more detailed example of the methodology of the present invention is presented in the flow diagrams of FIGS. 6–7. Consider for purposes of this example that the internationalization tool is referred to as "Msgs." Referring now to flow diagram 70 of FIG. 6, Blocks 72–84 illustrate in greater detail the methodology of the present invention for implementing Block 46 of FIG. 3. After identifying localizable strings and inserting "><" for each identified string as shown at Blocks 42 and 44 of FIG. 3, the internationalization tool Msgs is run on each of the Java class files that contain the "><" localizable strings to extract the localizable strings and generate a new version of the Java class file in a new directory as shown at Blocks 72 and 74. At Block 72, Msgs extracts the "><" strings into an intermediate message catalog, and at Block 74, Msgs generates a new version of the Java class file in the directory from which Msgs is run. Msgs is executed in the following manner:

Msgs -J -c $NLS_CAT -d $PRENLS_DIR -n $NLS_DIR -D . -K \ -p $PACKAGE_NAME $SOURCE_DIR/$SOURCE_FILE in which -J specifies "Java mode" and -c $NLS_CAT specifies the name for the message catalog. -d $PRENLS_DIR specifies the path to the pre-nls directory and this path may be a relative path; the pre-nls directory specified by $PRENLS_DIR contains the original message catalog file that was translated before. -n $NLS_DIR specifies the path to nls/C directory and this specification may also be a relative path. nls/C is a directory that will contain a new message catalog file that is effectively the entire contents of pre-nls/$NLS_CAT file with all of the new and modified messages that were found in the Java program. This new message catalog is called nls/C/$NLS_CAT file. Once this new nls/C/$NLS_CAT file is translated, it will replace $PRENLS_DIR/$NLS_CAT file. -D path specifies the destination for the output of the modified version of the Java class. The programmer should take care to not overwrite the original Java class file by specifying a different location than the original source location. -K is for the multiple message mode and must be specified. -p $PACKAGE_NAME specifies the complete name of the Java package to which the particular Java class belongs. $SOURCE_DIR is the path to the directory that stores the localizable Java class files identified by "><". This directory should be different from the directory from which the Msgs internationalization tool is executed, i.e. the value being passed to the -D option. $SOURCE-FILE is the name of the Java class file containing the localizable "><" strings. The execution of Msgs by the foregoing commands generates files in the $NLS_DIR directory and also rewrites a modified version of the .java file.

At Block 76, from within the same $NLS_DIR directory, the MsgHandler.java file is generated. MsgHandler.java file will be used by the Java code to retrieve the "><" localizable strings from a ListResourceBundle class. Please refer to FIG. 4 and the foregoing discussion for a detailed description of the MsgHandler.java file. The Msgs internationalization tool is executed in the following way to generate the MsgHandler.java file:

Msgs -J -g -c $NLS_CAT -d $PRENLS_DIR -n $NLS_DIR † -P $PACKAGE_NAME -B $BUNDLE_NAME in which -J specifies "Java mode", -g specifies the "./MsgHandler.java" generate function, -c $NLS_CAT specifies the name for the message catalog described above, -d $PRENLS_DIR specifies the path to the pre-nls directory described above, -n $NLS_DIR specifies the path to the nls/C directory described above, -p $PACKAGE_NAME specifies the complete name of the Java package to which this Java class belongs as described above, and -b $BUNDLE_NAME specifies the name to be used for the ListResourceBundle class that Msgs will generate (for instance, "$NLS_CAT"Res). The foregoing code will cause Msgs to generate a new file called MsgHandler.java as shown at Block 76.

Next, at Block 78, the Msgs internationalization tool generates a merged intermediate message catalog file. Msgs is executed in the following manner:

Msgs -J -M -c $NLS_CAT -d $PRENLS_DIR -n.

In which -J specifies "Java mode", -M specifies a merge mode, -c $NLS_CAT specifies the name for the message catalog (described above), -d $PRENLS_DIR specifies the path to the pre-nls directory described above, and -n specifies the current directory. This language will cause the Msgs tool to generate a message catalog-like file called $NLS_CAT.1 that contains the merged messages from pre-nls/$NLS_CAT.1 and the files in the current directory. At Block 80, the intermediate file nls/C/$NLS_CAT.1 generated by the Msgs tool is now available for localization, i.e. translation into another native language as shown at Block 64 of FIG. 5.

At Block 82, the programmer changes to the $NLS_DIR directory from which the Msgs tool generates a ListResourceBundle file from the intermediate message catalog file. As an example, MsgsP, a Perl script and not the Msgs executable, is executed in the following manner:

MsgsP_$NLS_CAT.1 $BUNDLE_NAME $PACKAGE_NAME

In which $NLS_CAT specifies the name for the message catalog (described above), $BUNDLE_NAME specifies the ListResourecBundle class name (described above), and $PACKAGE_NAME specifies the Java package name to which this ListResourceBundle belongs. MsgsP is run for each translated (localized) version of the message catalog. For instance, if you have a Japanese version of the message catalog stored in the nls/japanese file, MsgsP is run on nls/japanese/$NLS_CAT.1 as well.

Finally, at Block 84 all of the .java files are compiled, including the MsgHandler.java and $BUNDLE_NAME­.java files.

The flow diagram 90 of FIG. 7 further illustrates the methodology of the present invention, with particular emphasis on identifying modified strings that require new translations. At Block 92, the original Java file is opened and next, at Block 94, the pre-nls message catalog file is opened. At Block 95, the pre-nls message catalog file is copied to the nls message catalog file. A modified Java file is created (see Step 74 of FIG. 6) at Block 96. At Block 98 the contents of the original Java file are read into a buffer or other temporary storage area of a computer on which internationalization tool Msgs is running. Next, at Decision Block 100, the inquiry is whether the string from the original Java file read into the buffer contains "><" to indicate that it has been previously identified as a localizable string. If yes, then the inquiry, at Block 102, is whether the "><" string exists in the pre-nls message catalog file. If no, then the string is appended to the nls version of the message catalog file, typically at the end of the message catalog file, at Block 104 and the "><" are removed in the buffer at Block 106 to leave the default English string. If yes, the message number associated with the string is obtained at Block 108 and this "><" string is replaced in the buffer with a method call to "MsgHandler­getString( )" that can obtain the localized string at Block 110. The flow continues to Block 112.

Also from Decision Block 100, if the buffer does not contain a "><" string, the modified Java file is written from the buffer at Block 112. Decision Block 112 inquires as to whether there are any more strings in the buffer. If the end of the file has not been reached, then the flow returns to Block 98 from Decision Block 114. If the end of the file has been reached, however, the flow continues to Block 116. Finally, the original Java file, the pre-nls and nls message catalog files, and the modified Java file are closed at Blocks 116–120.

An advantage of the methodology of FIG. 6 is illustrated by Blocks 104 and 105. When a "><" string does not already exist in the message catalog specified by $NLS_CAT and stored in $PRENLS_DIR, this indicates that the string is new or has been modified and hence it has never been localized. This new, or modified, string is appended to the bottom of the copied version of the message catalog $NLS_DIR/$NLS_CAT. It is this $NLS_DIR/$NLS_CAT file, and not the $PRENLS_DIR/$NLS_CAT file, that is actually sent to the translators for translation. Because all of the new and/or modified strings are appended to the bottom of the file, the translators can easily identify which strings to translate, thereby significantly speeding up the translation effort.

The present invention solves a number of problems associated with internationalization of Java-based software and applications. First, the present invention generates message catalogs automatically from a given Java source code, which can then be used for translation. The automatic generation of message catalogs from Java source code avoids having to translate ListResourceBundle data structures which are difficult to translate. Next, the present invention automatically generates the ListResourceBundle data structures from the compiled or processed version of the message catalogs that were generated and translated so that the final result is compatible with Java's internationalization model. Additionally, the present invention automatically modifies the Java source code so that it loads and accesses ListResourceBundle data structures, thereby overcoming the cumbersome prior art procedure of having to write Java code that loads and accesses ListResourceBundle data structures.

The methodology of the present invention thereby provides a number of advantages over the prior-art methodology. The method is transparent to the user and provides a greatly needed degree of flexibility and consistency in internationalization of Java-based software in the art. The present invention is also time-saving. There is no need to extract strings from the source code for message catalogs; this step is automatically performed by the internationalization tool of the invention. Moreover, the present invention is much faster in that a time-consuming call to open a ListResourceBundle is not executed if a "><" string has not been localized. This provides for faster execution of the Java code. Also, de-coupling the process of translating strings from the process of internationalizing the Java code allows for ease of maintaining the software. The appending of new and/or modified translatable strings to the end of the $NLS_DIR/$NLS_CAT file makes it easy for the translator to find the strings to be translated at some future time.

While the invention has been particularly shown and described with reference to a preferred embodiment, it will be understood by those skilled in the art that various changes in form and detail may be made therein without departing from the spirit and scope of the invention. While only two strings have been discussed in the examples described above for ease of explanation, one skilled in the art will recognize that there are typically hundreds or even more localizable strings. With this great number of strings typically found in Java source code, it can be seen that the job of translating and maintaining the strings is extremely cumbersome using prior art approaches. The present invention greatly improves the efficiency and ease with which global Java source code may be written and maintained.

What is claimed is:

1. A method for generating localizable message catalogs for Java-based applications, comprising:
   identifying one or more localizable strings of a Java source code;
   marking the one or more localizable strings to produce one or more marked localizable strings by inserting a marker into each localizable string of the one or more localizable strings;
   extracting the one or more marked localizable strings;
   storing the one or more marked localizable strings into an external text file;
   generating a new version of the Java source code from which an internationalization tool is run;
   retrieving the marked localizable strings from a ListResourceBundle class;
   generating a merged external text file containing the one or more marked localizable strings;
   generating one or more ListResourceBundle files corresponding to the merged external text file with each ListResourceBundle file of the one or more ListResourceBundle files corresponding to a desired language; and
   compiling the one or more ListResourceBundle files and the Java source code.

2. The method of claim 1, wherein the external text file is a message catalog file.

3. The method of claim 1, wherein the marked localizable strings in the one or more intermediate message catalog files are function calls to the internationalization tool.

4. The method of claim 1, wherein retrieving the marked localizable strings from a ListResourceBundle class comprises:
   determining a current locale language in which the Java source code is running;
   determining whether the current locale language is a default language;
   if the current locale language is the default language, returning a marked localizable string of the one or more marked localizable strings;
   if the current local language is not the default language, determining whether a language-specific version of the marked localizable string that corresponds to the current locale language exists in a ListResourceBundle data structure of the one or more ListResourceBundle data structures that corresponds to the marked localizable string; and
   if the language-specific version exists, opening up the ListResourceBundle that corresponds to the marked localizable string and returning the language-specific version of the marked localizable string from the ListResourceBundle.

5. The method of claim 3, wherein the default language is English.

6. The method of claim 1, wherein the merged external text file is an intermediate message catalog file.

7. The method of claim 1, wherein after generating a merged external text file, further comprising:
   translating the one or more marked localizable strings in the merged external text file into one or more desired languages.

8. The method of claim 1, wherein the one or more marked localizable strings are stored into the external text file in a first directory and the new version of the Java source code is generated in a second directory.

9. A method for generating localizable message catalogs for Java-based applications, comprising:
   opening an original Java source code file;
   opening a first message catalog file;
   copying the first message catalog file to a second message catalog file;
   creating a modified Java source code file from the original Java source code file;
   reading the contents of the original Java source code file into a buffer;
   if the buffer contains one or more marked localizable strings, for each marked localizable string of the one or more marked localizable strings comprising:
      determining if the marked localizable string is stored in the first message catalog file;
      if the marked localizable string is stored in the first message catalog file, comprising:
         obtaining a message number corresponding to the marked localizable string; and
         replacing the marked localizable string in the buffer with a method call that can obtain the marked localizable string;
      if the marked localizable string is not stored in the first message catalog file, comprising:
         appending the marked localizable string to the second message catalog file; and
         removing a marker from the marked localizable string in the buffer to convert the marked localizable string to a default localized string;
   writing to the modified Java source code file from the buffer; and
   closing the original Java source code file, the first message catalog file, the second message catalog file, and the modified Java source code file.

10. The method of claim 9, wherein the original Java source code file is stored in a first directory and the modified Java source code file is created in a second directory.

11. A method for generating localizable message catalogs for Java-based applications, comprising:
   generating a plurality of modified Java source code files;
   generating a message catalog file having one or more localizable strings for a Java package;
   translating the message catalog file manually;
   generating a plurality of ListResourceBundle data structure files for the one or more localizable strings of the translated message catalog file, wherein the ListResourceBundle data structure files are not manually translated; and
   compiling the plurality of modified Java source code files and the plurality of ListResourceBundle data structure files.

* * * * *